Patented May 13, 1930

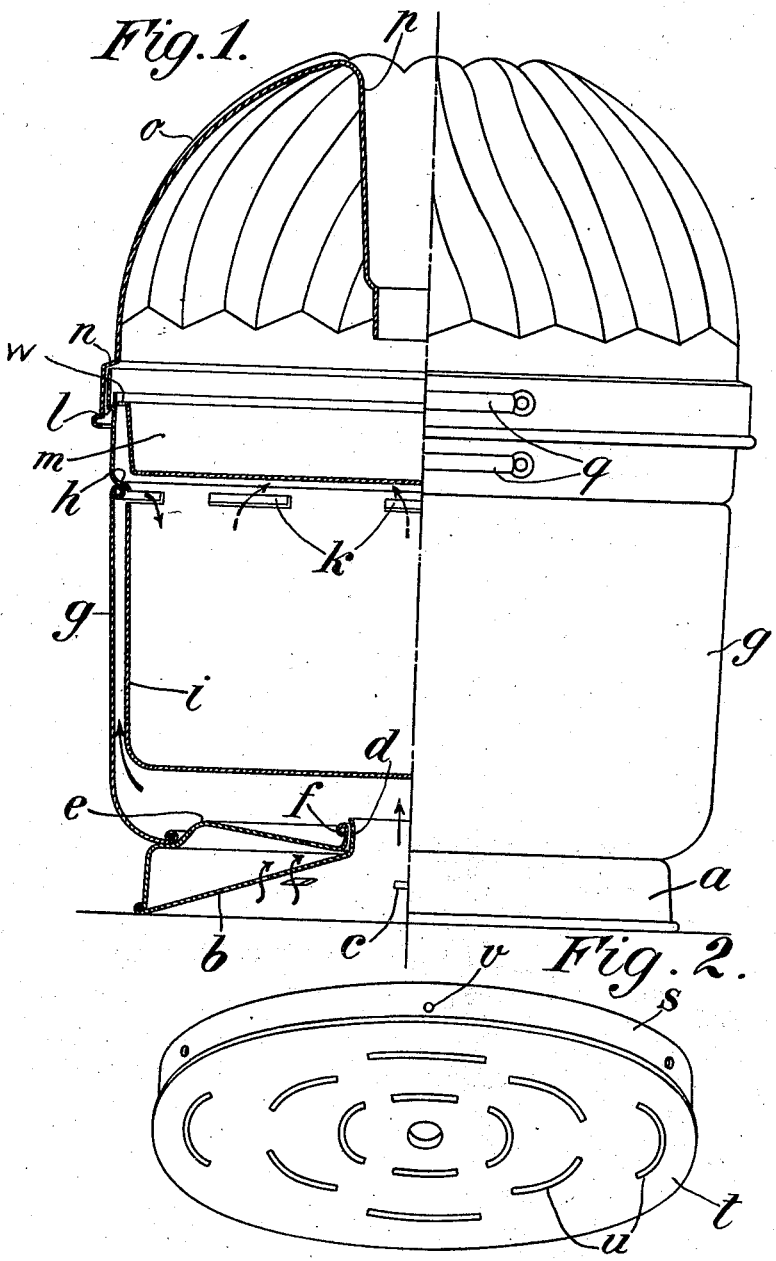

1,758,571

UNITED STATES PATENT OFFICE

EUGEN HAGER, OF OERLIKON, NEAR ZURICH, SWITZERLAND

BAKING AND ROASTING APPARATUS

Application filed November 15, 1928, Serial No. 319,666, and in Switzerland November 18, 1927.

This invention is an improvement in or a modification of the baking and roasting apparatus claimed in U. S. Patent No. 1,683,611 of 1928.

In the constructional form of apparatus illustrated and described in the said patent the roasting pan is provided with a central nozzle surrounding a nozzle on the base part. The opening in the bottom of the pan necessitated by the latter nozzle and the nozzle surrounding it are in many cases found to have disadvantages, as is the case in other similar systems. Hence, the object of the present invention is so to modify the apparatus, while retaining its advantages, that a roasting pan with a non-perforated bottom can be used.

In the accompanying drawing, Fig. 1 shows a constructional example of the improved apparatus, to the left in vertical axial section and to the right in elevation. Fig. 2 shows a perspective view from below of a base for electric heating.

In Fig. 1 of the drawing $a$ is a double base part intended to be placed on a gas burner and having a conical inner part $b$ with lateral openings $c$ and terminating in a nozzle $d$. The latter is surrounded with a little clearance by a nozzle $f$ in which the upper external part $e$ of the base $a$ terminates. The part $e$ forms the support and at the same time the lateral guiding means for a casing $g$ which is completely open at the top and bottom. On its upper rim the shoulder $h$ of the roasting pan $i$ rests, the non-perforated bottom of which lies a little above the nozzle $d$ and $f$ and the walls of which have openings $k$ immediately below the upper rim of the casing $g$. On an upper shoulder $l$ of the pan $i$ extending out beyond the lower part of the pan rests the perforated marginal flange of a low cake tin $m$ and a deep cake shape $o$ forming a shoulder $n$ is supported with this shoulder on the top rim of the roasting pan $i$. The diameter at the top of the funnel $p$ in the cake shape $o$ (in inverted position) is somewhat greater than the diameter of the nozzle $f$ of the base $a$, to enable the baking shape $o$ to be placed on the base $a$ when it is to be used for baking. The height of the nozzles $d$ and $f$ is made such that the heating gases emerging from them cannot escape laterally below the corrugations of the baking shape.

When the apparatus described is being used with the parts in the positions shown, that is to say for roasting or boiling in the pan $i$, the hot gases entering the base $a$ flow in part through the nozzle $d$ upwards and in part through the openings $c$ into the space lying between the cone $b$ and the upper part $e$ of the base, passing out round the nozzle $d$ through the nozzle $f$. They then sweep below the bottom of the pan $i$ and flow through the space between the wall of the pan $i$ and the casing $g$ upwards and at the top through the openings $k$ into the upper part of the pan $i$, where they provide a top heat, thereupon sweeping over the bottom of the cake tin $m$ which, when the apparatus is being used in this way, may suitably be used for holding vegetables, potatoes, pastry, cakes and the like. Finally the hot gases pass through the perforations $w$ in the marginal flange of the tin $m$ in to the baking shape $o$, where they can escape through the funnel $p$ when the latter is not closed by a suitable cover. Such a cover may be so constructed as to allow the passage of the gases and vapours to a greater or less extent or to obstruct them, that is to say, to regulate them and so as to be capable of being inserted in the funnel $p$ from the outside.

When the baking shape $o$ is to be used for baking purposes, the apparatus is placed in the inverted position, that is, the opposite position to that shown in Fig. 1, with the baking shape resting on the base $a$. The pan $i$ and the casing $g$ then act together as a hood, in which a cover can be placed on the latter for obstructing or regulating the escape of the hot gases and vapours passing from the pan through the slots $k$ into the space between the pan and the casing.

The base $s$ shown in Fig. 2 and intended to be used on an electric cooking plate comprises a turned cast plate $t$ provided with slots $u$ and over it a sheet metal wall having openings $v$ for enabling the heated air to escape from the base into the apparatus and to prevent an accumulation of such air in the base which would detrimentally affect the heating action. The conical part $b$ of the base $a$ is omitted in the case of the base $s$, but the upper part of the latter is made similar to the upper part $e$ of the base $a$.

When the apparatus is used in this manner the casing $g$ may be omitted and the cake tin $m$ placed bottom upwards with its marginal flange resting on the shoulder $n$ of the top baking shape $o$. In this way plenty of top heat is retained, while the escape of the hot gases is not entirely prevented.

What I claim is:—

1. A baking and roasting device comprising a casing completely open at the top and bottom, a roasting pan, two outwardly extending shoulders formed on this pan one above another, the lower of these shoulders being adapted to bear upon the top rim of the casing, openings in the wall of the pan immediately below this lower shoulder, a relatively low pan with an edge flange adapted to be supported by the upper shoulder of the roasting pan, the depth of the low pan being less than the distance between the two shoulders of the roasting pan.

2. A baking and roasting device comprising a hollow base part having a central nozzle extending upwards, guiding means arranged along the upper edge of the base part, a casing adapted to be supported by this base part and guided in lateral direction by said guiding means, a roasting pan adapted to be suspended inside the casing on the upper edge thereof in such position that its non-perforated bottom is distant from the nozzle of the base part, free space being left in connection with the nozzle between the casing and that part of the pan below the upper edge of the casing, openings in the wall of the pan below the top edge of the casing, a baking mould forming a shoulder and adapted to rest with this shoulder in inverted position on the upper edge of the baking pan above the casing, said shoulder on the baking mould being adapted to support the roasting pan in inverted position if the baking pan is placed upon the base part in position for baking.

3. A baking and roasting device comprising a base part having passages for leading the heating gases from bottom to top, a roasting pan with flat unperforated bottom, a shoulder formed on the upper part of this pan, a casing completely open at the top and bottom and adapted to support the pan on its shoulder in such a height that its bottom is distant from the base part.

4. A baking and roasting device comprising a base part having means for collecting the heating gases and leading them to an outlet opening on top of the base part, a cylindrical casing completely open at the top and the bottom, means for guiding this casing in lateral direction relatively to the base part, a deep roasting pan forming two annular shoulders one above another, openings in the wall of said pan immediately below the lower of said shoulders, this shoulder being adapted to bear upon the top rim of said casing, an inner pan provided with a perforated edge flange adapted to be supported by the upper of said shoulders, the height of the inner pan being less than the distance between said openings and the upper shoulder, a deep baking mould forming a shoulder adapted to be supported by the top edge of the deep roasting pan in inverted position, a central funnel formed on said baking mould, the upper part of the base part being formed so as to be adapted to guide the deep baking mould when resting on the base part in a position for baking and to prevent the heating gases leaving the base part from escaping in lateral direction between the base part and the baking form.

5. A baking and roasting device comprising a base consisting of a hollow conical inner part and a hollow upper outer part, these parts being firmly connected one with another at their common lower outer edge but leaving in the rest a hollow space between them, an upwardly extending nozzle formed on the central portion of each of these parts, a space being left between these two nozzles, openings in the conical wall of the inner part for the passage of hot gases, said outer part forming a supporting and guiding means, a casing completely open on each end and adapted to be supported and laterally guided on the outer part of the base, a roasting pan adapted to be supported on the top edge of this casing and a baking mould adapted to rest, in its inverted position, on the top edge of the roasting pan or to be placed in a position for baking on the base part and to be guided thereon in lateral direction.

6. A baking and roasting device according to claim 5, comprising a roasting pan, two annular outwardly extending shoulders on this pan one above another, the lower one of these shoulders being adapted to rest on the top edge of the casing, openings formed in the wall of the roasting pan beneath the lower of said shoulders, an inner baking or roasting tin having a perforated outwardly extending flange adapted to be supported by the upper of said shoulders, a deep baking mould having a shoulder adapted to rest on the upper edge of the roasting pan when the baking mould is in inverted position and adapted also to support the inner tin on its perforated flange when the deep baking pan is in position for baking.

7. A baking and roasting device comprising a hollow base plate terminating on top in a central nozzle, a casing completely open on the top and bottom, means on the base plate adapted to support this casing and to guide it in lateral direction relatively to the base plate, a deep roasting pan, two annular shoulders formed on the outside of this pan one above another, the lower of these shoulders being adapted to rest on the top rim of the casing when the roasting pan is in position for roasting, a relatively shallow baking and roasting tin having a perforated top flange adapted to rest alternately on the top rim of the casing or on the upper shoulder of the roasting pan, a deep baking mould having an annular shoulder adapted to rest in the inverted position of the baking mould on the top edge of the roasting pan when this is in position for roasting, whilst in the position for baking of the baking mould the shallow tin is adapted to rest on said shoulder of the deep baking mould in inverted position.

8. A baking and roasting device comprising a casing open at bottom and top, a roasting pan, two outwardly extending shoulders on this pan one above another, a deep baking mould forming a shoulder, a relatively low baking and roasting tin having an outwardly extending flange, said shoulders and this flange and the adjacent parts of said receptacles being dimensioned relatively one to another and to the top rim of said casing in such a manner that each of said receptacles can be supported on each of the two other receptacles in suitable manner and guided in lateral direction by one or the other part, the roasting pan and the low tin being adapted further to rest also upon the casing as well in position for roasting as in inverted position for collecting top heat for a receptacle arranged below thereof.

9. A baking and roasting device comprising a casing open at bottom and top, a roasting pan, two annular outwardly extending shoulders on this pan one above another, an upwardly extending rim on the outer edge of the upper one of these shoulders, the lower one of these shoulders being adapted to rest on the top rim of the casing in the position for roasting of the pan, a deep baking mould having a shoulder adapted to rest on the top rim of the roasting pan when the baking mould is in inverted position, a relatively low baking and roasting tin having an outwardly extending flange adapted to rest alternately directly on the top rim of the casing when the roasting pan is not used, or on the upper shoulder of this pan or in inverted position on the shoulder of the deep baking mould if this is in baking position, the upper shoulder of the roasting pan being adapted to rest on the top rim of the casing in the inverted position of said pan and the said shoulder on the deep baking form being adapted to rest on the outwardly extending flange of the tin when the latter rests directly on the top rim of the casing, the roasting pan being adapted to rest in inverted position on said shoulder of the deep baking mould when this is in baking position, means being provided on said three receptacles to guide them relatively one on another and on the casing in each of the various positions mentioned hereabove.

In testimony whereof I have affixed my signature.

EUGEN HAGER.